United States Patent [19]

Mani

[11] 3,816,283

[45] June 11, 1974

[54] RADIATION POLYMERIZABLE VINYL ESTER RESINS CONTAINING 2-OXAZOLINE AND GUANIDINE ADDITIVES

[75] Inventor: Inder Mani, Midland, Mich.

[73] Assignee: The Dow Chemical Company, Midland, Mich.

[22] Filed: May 13, 1971

[21] Appl. No.: 142,853

[52] U.S. Cl...... 204/159.15, 117/93.31, 117/132 B, 117/132 BE, 117/161 ZB, 117/161 UZ, 204/159.16, 204/159.22, 204/159.23, 260/41 A, 260/41 B, 260/836, 260/837 R
[51] Int. Cl. .......................... C08d 1/00, C08f 1/00
[58] Field of Search. 96/115 P; 204/159.23, 159.15, 204/159.16; 260/837 R

[56] References Cited
UNITED STATES PATENTS

| | | | |
|---|---|---|---|
| 2,673,151 | 3/1954 | Gerhart | 95/7 |
| 2,921,006 | 1/1960 | Schmitz et al. | 204/159.15 |
| 3,377,406 | 4/1968 | Newey et al. | 260/837 R |
| 3,420,914 | 1/1969 | May | 260/837 R |
| 3,552,986 | 1/1971 | Bassemir et al. | 204/159.23 |
| 3,558,387 | 1/1971 | Bassemir et al. | 204/159.23 |
| 3,560,237 | 2/1971 | Miller | 260/837 R |
| 3,597,343 | 8/1971 | Delzenne et al. | 204/159.23 |
| 3,650,669 | 3/1972 | Osborn | 204/159.22 |
| 3,660,217 | 5/1972 | Kehr et al. | 204/159.22 |

FOREIGN PATENTS OR APPLICATIONS 1,087,403  10/1967  Great Britain

*Primary Examiner*—Murray Tillman
*Assistant Examiner*—Richard B. Turer
*Attorney, Agent, or Firm*—H. L. Aamoth

[57] ABSTRACT

The addition of at least about 0.3 weight percent of a 2-oxazoline, a guanidine or certain amines to a thermosettable mixture of certain vinyl monomers and a polymerizable vinyl ester resin reduces the dosage level of ionizing radiation required to cure the mixture.

16 Claims, No Drawings

3,816,283

RADIATION POLYMERIZABLE VINYL ESTER RESINS CONTAINING 2-OXAZOLINE AND GUANIDINE ADDITIVES

BACKGROUND OF THE INVENTION

This invention relates to the field of ionizing radiation cure of polymerizable materials and to coatings of same and especially relates to a promoter to reduce the ionizing radiation level or dosage necessary to effect a cure of said materials.

From a commercial standpoint radiation curing offers a number of advantages over thermal catalyst-initiated cures: immediate initiation of polymerization, extended pot-life of the curable materials, little temperature rise so heat sensitive substrates may be employed in coatings, better control of the polymerization reaction, superior substrate-coating bonds are produced and much higher concentrations of radicals may be produced instantaneously. However, these advantages are difficult to realize if the curable materials require high curing doses of ionizing radiation since the economics become prohibitive. Commercialization then depends on reducing the cost of the curing process by finding methods and materials to effect a cure at lower dosages.

The search for means to accelerate or promote radiation curing is evident by a number of patents relating to certain polymerizable materials. While neither the promoters or the polymerizable materials employed correspond in any way to this invention, patents representative of such efforts include U. S. Pat. Nos. 3,202,513; 3,251,759; 3,265,604; 3,352,771 and 2,979,446. Commercially it is desirable to be able to cure at dosages of no more than 2 to 3 megarads but it would be of great advantage to be able to cure at 1 megarad or even less.

SUMMARY OF THE INVENTION

According to this invention the curing dosage of ionizing radiation required to cure in an inert atmosphere a mixture of certain vinyl monomers and a polymerizable vinyl ester resin is reduced by adding to the mixture at least 0.3 weight percent of certain nitrogen containing materials.

The vinyl ester resin is prepared by reacting essentially equivalent amounts of an unsaturated monocarboxylic acid, such as methacrylic acid, with a polyepoxide of a polyhydric phenol having more than one epoxide group per molecule. The nitrogen materials include 2-oxazolines, guanidines and certain amines which are more fully described hereafter.

DESCRIPTION OF THE INVENTION

Vinyl ester resins are a newer class of thermosettable resins which may be generally defined as a reaction product of an unsaturated monocarboxylic acid with a polyepoxide resin having more than one epoxide or oxirane group per molecule. The reactants are usually combined in about equivalent proportions of acid to epoxide groups, whereby the reaction of said acid with said epoxide produces a terminal polymerizable group connected to the polymer chain by

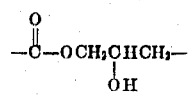

linkages, A vinyl ester resin prepared by reacting about equivalent amounts of acrylic acid with a diglycidyl ether of bisphenol A may be illustrated by the following formula:

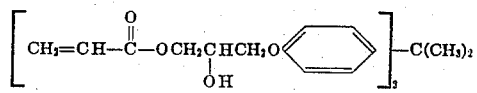

The general methods by which vinyl ester resins may be prepared are thoroughly described in the patent literature. Representative patents which describe the resins and their preparation include U. S. Pat. Nos. 3,066,112; 3,179,623; 3,256,226; 3,301,743 and 3,377,406.

For this invention useful polymerizable vinyl ester resins include those which are prepared by reacting an unsaturated monocarboxylic acid with a polyepoxide of a polyhydric phenol wherein the polyepoxide has an epoxide equivalent weight of about 150 up to 1000 and even higher. Said polyepoxides are made by reacting at least about two moles of an epihalohydrin, such as epichlorohydrin, with one mole of a polyhydric phenol and a sufficient amount of an alkali to combine with the halogen of the halohydrin. Polyhydric phenols include the familiar bisphenol A as well as p,p'-dihydroxydiphenyl, p,p'-dihydroxyphenyl sulfone p,p'-dihydroxybenzophenone, p,p'-dihydroxydiphenylmethane, the various other position isomers of the above polyhydric phenols, polyhydric phenolic formaldehyde condensation products (novolac resins) and the like. Mononuclear phenols such as resorcinol, catechol, hydroquinone, phloroglucinol and the like may also be employed. The polyepoxides are characterized in having more than one epoxide group per molecule.

Unsaturated monocarboxylic acids useful in preparing vinyl ester resins have the formula

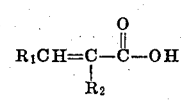

where $R_1$ may be hydrogen, chlorine, bromine or phenyl and $R_2$ may be hydrogen, chlorine, bromine or a lower alkyl group of 1 to 4 carbon atoms. Said acids include acrylic acid, methacrylic acid, cinnamic acid, α-chloroacrylic acid and the like.

Various catalysts may be used in the preparation of vinyl ester resins. Catalysts include tertiary amines such as tris(dimethylaminomethyl)phenol, onium catalysts, triphenyl stibine and triphenyl phosphine and the like. Usually hydroquinone or other like polymerization inhibitors are added to prevent polymerization during the preparation of the resin.

According to this invention the polymerizable materials comprise a mixture of said vinyl ester resin with certain copolymerizable vinyl monomers. Only certain monomers may be employed with this invention provided the monomers are essentially nonvolatile. By this it is meant to exclude monomers which are predominantly gases at ambient temperatures. It is obvious that if the monomer is too volatile a substantial portion of the monomer would evaporate from a film or coating before the mixture of monomer and resin could be cured. Monomers which are normally liquid at room temperature may be used even though there may be a small loss of monomer by evaporation. It is possible to operate the process of this invention under higher pressures than atmospheric pressure to minimize any loss of said normally liquid monomers.

Useful monomers meeting the above requirements include both mono- and polyunsaturated monomers. Polymerizable monounsaturated monomers include vinyl carboxylic acids such as acrylic and methacrylic acid; vinyl nitrile monomers such as acrylonitrile and methacrylonitrile; alkyl and hydroxyalkyl esters of vinyl carboxylic acids such as methyl acrylate, butyl acrylate, cyclohexyl methacrylate, hydroxyethyl methacrylate, hydroxypropyl acrylate, hydroxybutyl methacrylate and the like where the alkyl group contains from 1 to about 8 carbon atoms; vinyl amide monomers such as acrylamide, diacetone acrylamide and the like; and mixtures thereof. Aromatic monomers such as styrene are inoperative with this invention.

A variety of polyunsaturated polymerizable monomers within the above classes may be used including ethylene glycol dimethacrylate, trimethylol propane trimethacrylate, methylene bisacrylamide and other similar monomers.

The polymerizable materials of this invention are especially useful in coating various substrates such as metal, wood and the like either as a primer coating and/or a finished coating. In order to obtain the benefits of this invention at least 0.3 weight percent of the nitrogen containing material is added to the polymerizable materials. While quite large amounts of the nitrogen containing material may be added there is no advantage in doing so. Preferably the amount ranges from about 0.5 to 10 weight percent and most preferably from about 2 to 5 weight percent.

When employed as coating formulations other additives may be incorporated into the coating, for example, various inert fillers and pigments such as kaolin clay, titanium dioxide, silica, various inorganic oxides and the like. Films cast from the coating formulations may be rapidly cured by exposing them in an inert atmosphere to ionizing radiation (accelerated particulate radiation). A beam intensity of at least 50 microamperes is usually employed, but this invention is not limited thereto and lower beam intensities may be employed.

Generally the films or coatings will range in thickness from about 0.1 mil up to about 10 mils. However, depending on the accelerating voltage, thicknesses up to 250 mils or higher are feasible. The radiation curing step should be performed in an inert atmosphere. By this it is meant an atmosphere which is essentially free of oxygen since the presence of oxygen may result in an undesirable tacky surface. It is sufficient for this purpose to place a thin film of a plastic material such as a polyester (Mylar) film on the cast film or coating. Other means may be used such as curing in a chamber containing an essentially oxygen free atmosphere such as nitrogen, helium, argon and the like.

Accelerated particulate (ionizing) radiation includes particles such as electrons, protons, deuterons, other ions and the like. However, from an industrial standpoint, the cost and availability of machines limit ionizing radiation curing to accelerated electrons for the immediate future. A variety of devices are available to provide accelerated electron radiation or varying voltages and beam intensities. Typical of such devices is the familiar Van de Graaff accelerator. Similar commercial accelerators utilizing various acceleration means are available from Texas Nuclear Corporation, (cascade rectified system) High Voltage Engineering, (insulated core transformer system) General Electric (a resonant transformer design) and Radiation Dynamics, Inc. (radio frequency cascade rectifier system).

Nitrogen containing materials include 2-oxazo-lines, guanidines and certain amines. The 2-oxazolines include 2-oxazoline itself, and substituted 2-oxazolines having the formula

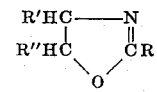

wherein $R'$ and $R''$ may be hydrogen, ethyl, methyl, phenyl and the like. R may be an alkyl, aryl, aralkyl group or hydrogen. Such substituted oxazolines include 2-methyl-2-oxazoline, 2,5-diphenyl-2-oxazoline; 2-phenyl, 5-methyl-2-oxazoline; 2-methyl, 5-phenyl-2-oxazoline and the like. Also included within the term 2-oxazolines are the bis oxazolines such as 2,2'-tetramethylene bis(2-oxazoline), 2,2'-oxydiethylene bis(2-oxazoline; 2,2'-thiodiethylene bis(2-oxazoline) and the like. Guanidines include guanidine, tetramethyl guanidine and the like.

Amines which may be employed have the formula $R_1R_2R_3N$ wherein $R_1$ may be an alkyl or an aralkyl group, $R_2$ and $R_3$ each may be hydrogen or an alkyl group or $R_1$ and $R_2$ together may be a cyclic alkylene radical or an oxydialkylene radical. Alkyl groups include methyl, ethyl, propyl, n-butyl, isobutyl and higher alkyl groups. Typical amines include mono-, di- and tri-n-butyl amine, di-isobutyl amine, triethyl amine, cyclohexylamine, benzyl amine, morpholine, piperidine and the like.

The following non-limiting examples will further illustrate the invention. All parts and percentages are by weight unless otherwise specified.

EXAMPLE 1

A vinyl ester resin was prepared by reacting methacrylic acid (31 percent) with a glycidyl polyether of bis-phenol A having an epoxide equivalent weight (EEW) of 186–192 (D.E.R. 331). The vinyl ester resin was then mixed with n-butyl acrylate in the proportions of 2/1 and to this resin was then added 3 percent of various nitrogen containing compounds, based on weight of resin and monomer. A film was cast with a 7 mil draw-down bar on a Q-panel (4 inches × 12 inches × 0.03 inch) and covered with a 2 mil sheet of Mylar (polyester) film to exclude air. The coated polished steel Q panel was then passed through a 2 Mev electron beam from a Van de Graaf accelerator filtered with 0.33 gm/cm² Al. A 50 microampere beam current and a conveyor speed of 3.4 cm/sec delivered a dose of 0.1 Megarad (Mrad) for each pass through the beam.

Without any accelerator the resin required 0.5 megarads (Mrad) to cure. While this dose level is already low, the addition of di-n-butyl amine reduced the dosage required to 0.1–0.2 Mrad. Similarly, when tetramethyl-guanidine and 2-oxazoline were employed as the accelerators the dosage was reduced to 0.2 and 0.4

Mrad, respectively. Tests made with styrene in place of the butyl acrylate failed to evidence the reduction in curing dosage.

EXAMPLE 2

When the resin of the previous example was mixed with 2-hydroxyethyl acrylate (50/50), the mixture required 0.3 Mrad to cure. Even at this low dosage the addition of 3 percent weight of dibutyl amine reduce the dosage to cure to 0.15 Mrads.

EXAMPLE 3

Another vinyl ester resin made by reacting methacrylic acid (32.0 percent) with a mixture of D.E.R. 331 (17.7 percent) and an epoxy novolac (50.3 percent) having an EEW of 175–182 was mixed with n-butyl acrylate (2/1) and tested as in Example 1. Without an accelerator 0.5–0.6 Mrad was required to cure the mixture. The addition of 3 percent of di-n-butyl amine, 2-oxazoline or tetramethylguanidine reduced the dosage to cure to 0.2, 0.4 and 0.3 Mrad, respectively.

EXAMPLE 4

The resin of Example 3 was mixed with 2-hydroxyethyl-acrylate 50/50 and the curing dosage was reduced from 0.3 to 0.15 Mrad.

EXAMPLE 5

A further series of tests were run with the vinyl ester resin of Example 1 mixed with different monomers and employing various accelerating materials of the invention. The curing dose in Mrad for each of the various combinations employing the procedure of Example 1 is shown below.

CURING DOSE, MRAD

| Additive (3%) te (2/1) | Resin of Example 1 mixed with- | | |
| --- | --- | --- | --- |
| | n-butyl acrylate | cellosolve acrylate (2/1) | hydroxypropyl acrylate* (1/1) |
| None | 0.5–0.6 Mrad | 0.5–0.6 Mrad | 0.3 Mrad |
| di-n-butylamine | 0.2 | 0.2 | 0.1–0.15 |
| Triethylamine | 0.2–0.3 | 0.2 | 0.1–0.15 |
| piperidine | 0.2 | 0.2 | 0.1–0.25 |
| morpholine | 0.2–0.3 | 0.2–0.3 | 0.15–0.2 |
| benzylamine | 0.3 | 0.3 | 0.2 |
| tetramethylguanidine | 0.2–0.3 | 0.2 | 0.15–0.2 |
| 2,2'-tetramethylene bis(2-oxazoline) | 0.3–0.4 | 0.3 | 0.2–0.25 |

*25 microamp beam current

EXAMPLE 6

Similar to Example 5 another series of tests were made with the resin of Example 3 with the following results.

CURING DOSE, MRAD

| Additive (60/40) | Resin of Example 3 mixed with | |
| --- | --- | --- |
| | n-butyl acrylate | hydroxyethyl acrylate* (60/60) |
| None | 0.5–0.6 | 0.25–0.3 |
| di-n-butyl amine | 0.2 | 0.1–0.15 |
| Triethylamine | 0.2 | 0.1–0.15 |
| piperidine | 0.2 | 0.1–0.15 |
| morpholine | 0.1–0.3 | 0.15–0.2 |
| benzylamine | 0.3 | 0.1–0.15 |
| 2,2'-tetramethylene bis(2-oxazoline) | 0.4 | 0.15 |
| tetramethylguanidine | 0.3 | 0.1–0.15 |

*25 microamp beam current

It will be understood that the present invention is not limited to the specific materials, steps and other specific details described above but may embody various modifications insofar as they are defined in the following claims.

What is claimed is:

1. A process for curing a mixture of a polymerizable vinyl ester resin and a nonvolatile vinyl monomer selected from the group consisting of vinyl carboxylic acids, vinyl nitriles, vinyl amides, alkyl and hydroxyalkyl esters of vinyl carboxylic acids wherein the alkyl group contains from 1 to 8 carbons, and mixtures thereof, said process comprises exposing said mixture in an inert atmoxphere to ionizing radiation in the presence of at least about 0.3 weight percent based on the weight of the mixture of a nitrogen containing compound selected from the group consisting of 2-oxazolines and guanidines; and wherein said vinyl ester resin is prepared by reacting essentially equivalent amounts of a polyepoxide of a polyhydric phenol having more than one epoxide group per molecule with an unsaturated acid having the formula

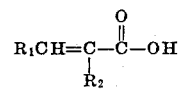

where $R_1$ is chlorine, bromine, hydrogen or phenyl and $R_2$ is hydrogen, chlorine, bromine or a loweralkyl group of 1 to 4 carbon atoms.

2. The process of claim 1 wherein said polyhydric phenol is bisphenol A, a novolac resin or mixtures thereof.

3. The process of claim 1 wherein said unsaturated acid is acrylic acid or methacrylic acid.

4. The process of claim 1 wherein said nitrogen compound is present in about 0.5 to 10 weight percent.

5. The process of claim 1 wherein said nitrogen compound is present in about 2 to 5 weight percent.

6. The process of claim 1 wherein said nitrogen compound is guanidine or tetramethyl guanidine.

7. The process of claim 1 wherein said nitrogen compound has the formula

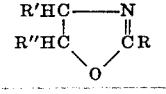

wherein R' and R'' may be hydrogen, phenyl, ethyl or methyl and R may be hydrogen, an alkyl group, an aryl group or an aralkyl group.

8. The process of claim 1 wherein said 2-oxazoline is 2,2'-tetramethylene bis(2-oxazoline), 2,2'-oxydiethylene bis(2-oxazoline) or 2,2'-thiodiethylene bis(2-oxazoline).

9. A thermosettable mixture suitable for curing by exposure to low levels of ionizing radiation comprising a mixture of a polymerizable vinyl ester resin and a nonvolatile vinyl monomer selected from the group consisting of vinyl carboxylic acids, vinyl nitriles, vinyl amides, alkyl and hydroxyalkyl esters of vinyl carboxylic acids wherein the alkyl group contains from 1 to 8 carbons, and mixtures thereof, said mixture containing at least about 0.3 weight percent based on the weight of the mixture of a nitrogen containing compound selected from the group consisting of 2-oxazolines and guanidines and wherein said polymerizable vinyl ester resin is prepared by reacting essentially equivalent amounts of a polyepoxide of a polyhydric phenol having more than one epoxide group per molecule and an unsaturated acid having the formula

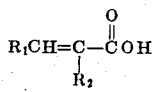

where $R_1$ is hydrogen, chlorine, bromine or phenyl and $R_2$ is hydrogen, chlorine, bromine or a lower alkyl group of 1 to 4 carbon atoms.

10. The mixture of claim 9 wherein said polyhydric phenol is bisphenol A, a novolac resin or mixtures thereof.

11. The mixture of claim 9 wherein said unsaturated acid is acrylic acid or methacrylic acid.

12. The mixture of claim 9 wherein said nitrogen compound is present in about 0.5 to 10 weight precent.

13. The mixture of claim 9 wherein said nitrogen compound is present in about 2 to 5 weight percent.

14. The mixture of claim 9 wherein said nitrogen compound is guanidine or tetramethyl guanidine.

15. The mixture of claim 9 wherein said nitrogen compound has the formula

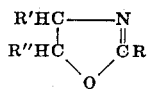

wherein R' and R'' may be hydrogen, phenyl, ethyl or methyl and R may be hydrogen, an alkyl group, an aryl group or an aralkyl group.

16. The mixture of claim 9 wherein said 2-oxazoline is 2,2'-tetramethylene bis(2-oxazoline), 2,2'-oxydiethylene bis(2-oxazoline) or 2,2'-thiodiethylene bis(2-oxazoline).

* * * * *

UNITED STATES PATENT OFFICE
CERTIFICATE OF CORRECTION

Patent No. 3,816,283   Dated June 11, 1974

Inventor(s) Inder Mani

It is certified that error appears in the above-identified patent and that said Letters Patent are hereby corrected as shown below:

Column 2, line 1, the comma after the word "linkages" should be a period.

Column 4, line 10, the word "2-oxazo-lines" should be --2-oxazolines--.

Column 5, line 9, between the words "percent" and "weight", insert the word --by--.

Column 5, in the table "CURING DOSE, MRAD" which appears under Example 5, insert the figure --(2/1)-- under the heading "n-butyl acrylate".
In the same table, under the last column, the fourth figure down "0.1-0.25" should read --0.1-0.15--.

Column 5, in the table which appears under Example 6, insert the figure --(60/40)-- under the heading "n-butyl acrylate". In the same table under the heading "hydroxyethyl acrylate"* the figure "(60/60)" should be --(60/40)--. In the same table under the first column, the fifth number down "0.1-0.3" should read --0.2-0.3--.

Column 6, in Claim 1, line 20, the word "atmoxphere" should be --atmosphere--.

Signed and sealed this 5th day of November 1974.

(SEAL)
Attest:

McCOY M. GIBSON JR.
Attesting Officer

C. MARSHALL DANN
Commissioner of Patents